July 24, 1951  E. W. DAVIS  2,561,786
CENTRALIZED LUBRICATING SYSTEM
Filed July 19, 1946
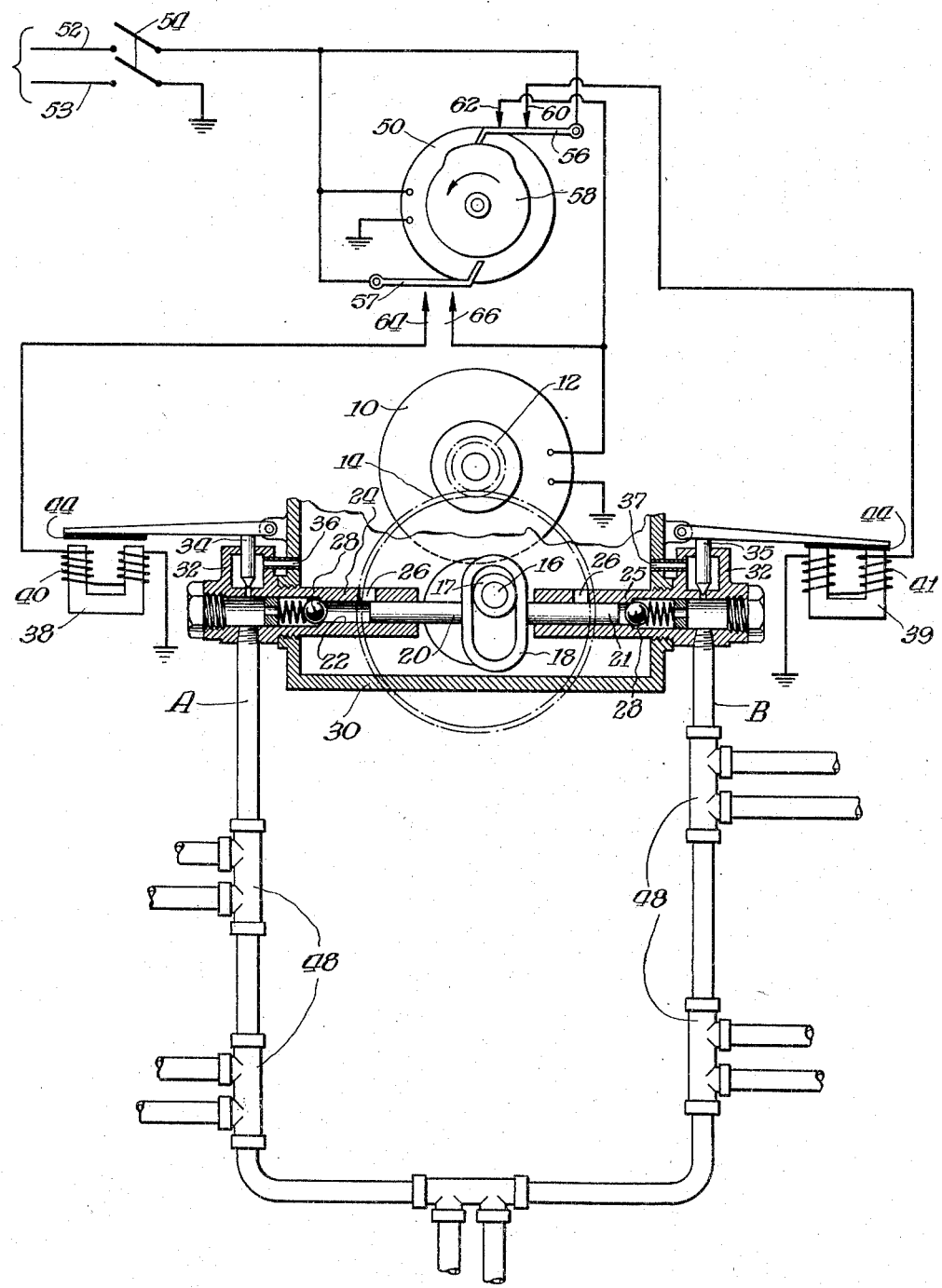
Inventor:
Ernest W. Davis
By:
Hinkle, Horton, Ahlberg, Hausmann & Wepper
Attorneys Patented July 24, 1951

2,561,786

UNITED STATES PATENT OFFICE 2,561,786

CENTRALIZED LUBRICATING SYSTEM

Ernest W. Davis, River Forest, Ill.

Application July 19, 1946, Serial No. 684,643

4 Claims. (Cl. 184—7)

My invention relates generally to centralized lubricating systems, and more particularly to improved means for alternately supplying lubricant under pressure to the opposite ends of a conduit connecting feeder valves in series, or alternately to the two conduits of a dual line centralized lubricating system.

In a number of different types of centralized lubricating systems it is required alternately to supply the lubricant under pressure to two different conduits or to the opposite ends of the same conduit, while relieving the lubricant pressure in the conduit not being supplied with lubricant under pressure. Lubricating systems of these types are shown in the patents to John T. Leonard No. 2,022,005 and 2,440,410 and to R. Wedeburg No. 2,392,017.

It is thus the primary object of my invention to provide an improved means for supplying lubricant under pressure alternately to two outlets forming part of a centralized lubricating system, while relieving the lubricant pressure at the outlet which is not being supplied with lubricant under pressure.

A further object is to provide an improved means for intermittently supplying lubricant under pressure to the conduits of a centralized lubricating system.

Other objects will appear from the following description, reference being had to the accompanying drawing which is a diagrammatic representation of the apparatus and includes a schematic wiring diagram.

The apparatus includes an electric motor 10 which, through a pinion 12, gear 14, crank pin 16, roller 17, and scotch crosshead yoke 18, reciprocates a pair of plungers 20 and 21. The plungers 20 and 21 are reciprocable in similar cylinders 22 formed in pump bodies 24 and 25, respectively. Each of the cylinders has an inlet port 26, and a spring pressed outlet ball check valve 28. The pump bodies 24 and 25 are secured to and project through the walls of a lubricant reservoir 30, and each of the bodies is provided with a relief valve port 32 adapted to be closed by suitably guided valves 34 and 35, respectively. These valves are preferably of the "open-shut" type, that is, they are two position valves which are closed in one position and open in the other. The valve chambers communicate with the interior of the reservoir 30 through pipes 36 and 37, respectively.

The valve 34 is adapted to be held against its seat by an electromagnet 38 operating through an armature 40 pivoted on a lug 42 forming part of the reservoir 30, the armature being provided with a nonmagnetic sheet 44 to prevent the armature from sticking to the electromagnet. The valve 35 is similarly arranged to be held in closed position by the energization of an electromagnet 39 having an armature 41 engaging the end of the valve 35. The armatures 40 and 41 engage the valves 34, 35 at a point close to the pivot of the armature so that the electromagnets may apply a substantial force to hold the valves in closed position.

The parts to be supplied with lubricant are each provided with a suitable measuring or feeder valve 48, which may be of any suitable construction such, for example, as shown in Leonard Patent No. 2,115,637. These valves are connected in series by suitable conduits, one end A of the conduit system being connected to the pump body 24, while the other end B is connected to the pump body 25.

In order that the measuring or feeder valves 48 will operate to discharge measured quantities of lubricant to their respective bearings, it is necessary that lubricant under pressure be caused to flow first into the end A, while relieving the pressure at the end B of the conduit system, and that thereafter the lubricant under pressure be supplied to the end B while relieving the pressure in the end A of the conduit system. This cycle of applying and relieving lubricant pressure at the ends of the conduit system is repeated at timed intervals, of duration depending upon the character of lubrication required by the parts of the machine being lubricated.

This timing is accomplished by means of a suitable synchronous motor 50 connected to line conductors 52 and 53, upon closure of the main switch 54. For the sake of simplicity, the line switch is illustrated as connecting the line conductor 53 to ground while it connects the line conductor 54 to a pair of contact arm cam followers 56 and 57, as well as to the synchronous motor 50. The synchronous motor 50 drives a cam 58 through suitable speed reduction gearing. This cam may be arranged to rotate at a speed of one revolution per hour, or any other suitable interval, depending upon the frequency of lubrication required. The cam follower contact arm 56, when engaged by the high point of the cam 58 is adapted to complete two circuits. Engagement of the arm 56 with contact 60 completes a circuit to electromagnet 39 while the engagement of the arm with the contact 62 completes a circuit to energize motor 10. As the cam 58 rotates through 180°, it will, after permitting contacts 60 and 62 to open, cause the cam follower arm 57 to engage contacts 64 and 66, thus completing circuits to energize the electromagnet 38 and the motor 10.

The apparatus operates in the following manner. Assuming that the main switch 54 is closed, the synchronous motor 50 will drive the cam 58 at a constant speed, and in the position in which the cam is shown in the drawing, it will have closed the circuits to the motor 10 and the electromagnet 39. The energization of the electromagnet 39 holds the valve 35 in closed position so that the discharge of the pump 25 will be through the end B of the conduit and lubricant will flow successively to the measuring or feeder valves 48. The pump 24 operates continuously while the motor 10 is energized but the lubricant pumped thereby may flow relatively freely past the valve 34 and through the pipe 36 into the lubricant reservoir. The high point on the cam 58 is of sufficient angular extent relative to its speed of rotation that the pumps will thus operate for an interval of time adequate for the operation of all of the measuring valves.

The measuring valves are of such construction that after they have operated to supply measured charges of lubricant to their connected bearings, the lubricant will continue to flow through the measuring valves and conduit system and eventually be discharged through the end A of the conduit. The lubricant thus discharged is also free to flow to the reservoir through the port 32 and pipe 36 since the electromagnet 38 is not energized and the valve 34 is free to move from its seat. After the cam has rotated a sufficient distance to permit the follower arm 56 to move away from the contacts 60 and 62, the motor 10 will be deenergized and both electromagnets 38 and 39 likewise deenergized so that both ends A and B of the conduit will be vented to the reservoir 30.

After the cam has moved a sufficient distance to engage the follower arm 57, circuits to the electromagnet 38 and motor 10 will be completed and the valve 34 thus held in closed position. Pressure will therefore build up at the conduit end A while the conduit end B will remain vented to the lubricant reservoir 30. The lubricant will thereby be caused to flow in the reverse direction through the measuring valves, to discharge measured quantities of lubricant to the bearings to which the measuring valves are connected and to reset the measuring valves for the next half cycle of operation.

The lubricant pumping and controlling apparatus may be used in conjunction with so called dual line lubricating systems in which the measuring valves are connected in parallel between two line conduits and are operated by alternately supplying lubricant under pressure to one of the line conduits while the other conduit is being vented.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. Apparatus for alternately supplying lubricant under pressure to two conduit ends, comprising a lubricant reservoir, a pair of pumps receiving lubricant from the reservoir and having their outlets connected respectively to the conduit ends, a single motor driving both of said pumps, means forming passageways respectively connecting the conduit ends with the reservoir, a pair of electromagnetically operated open-shut valves respectively controlling the flow of lubricant through said passageways, a source of electric current, and a circuit controller operable to connect the source to the motor intermittently at intervals of predetermined duration and to connect the electromagnetically operated valves to the current source alternately during the successive intervals that the motor is energized, whereby the discharge from one of the pumps will be vented to the lubricant reservoir while the discharge of the other is being supplied to its connected conduit end.

2. Apparatus for alternately supplying lubricant under pressure to two conduit ends A and B, comprising a lubricant reservoir, a pair of pumps receiving lubricant from the reservoir and having their outlets connected respectively to the conduit ends A and B, a single motor driving both of said pumps, passageways respectively connecting the conduit ends A and B with the reservoir, a pair of open-shut valves respectively controlling the flow of lubricant through said passageways, electromagnetic means for operating the valves, a source of electric current, and a circuit controller operable to connect the source to the motor intermittently at intervals of predetermined duration and to connect the electromagnetic means to the current source alternately during the successive intervals that the motor is energized, whereby the discharge from one of the pumps will be vented to the lubricant reservoir while the discharge of the other is being supplied to its connected conduit end.

3. In a lubricating system, the combination of a pair of pumps for supplying lubricant under pressure respectively to two conduit ends, a driving motor connected to the pumps, electromagnetically operated open-shut valves connected with the conduit ends respectively to vent the latter, and a timing control means intermittently energizing the motor while alternately energizing the electromagnetic valves.

4. In a lubricating system, the combination of a lubricant reservoir, a pair of conduit ends, a pair of pumps receiving lubricant from the reservoir, and forcing it under pressure into the conduit ends respectively, a motor connected to drive the pumps, electromagnetically operated open-shut valves connected to the conduit ends respectively to vent the latter to the lubricant reservoir, and a timing control means for intermittently energizing the pump operating motor for intervals of predetermined duration, and during alternate intervals energizing the electromagnetic valves.

ERNEST W. DAVIS.

REFERENCES CITED

The following references are of record in the file of this patent:

UNITED STATES PATENTS

| Number | Name | Date |
|---|---|---|
| 2,007,156 | Burrell | July 9, 1935 |
| 2,022,005 | Leonard | Nov. 26, 1935 |
| 2,068,392 | Acker | Jan. 19, 1937 |
| 2,339,532 | Venable | Jan. 18, 1944 |